United States Patent
Elias

(10) Patent No.: US 9,797,984 B2
(45) Date of Patent: Oct. 24, 2017

(54) MOBILE PORTABLE DEVICE AND POSITIONING

(71) Applicant: Fraunhofer Portugal Research, Oporto (PT)

(72) Inventor: Dirk Elias, Matosinhos (PT)

(73) Assignee: Fraunhofer Portugal Research, Porto (PT)

( * ) Notice: Subject to any disclaimer, the term of this patent is extended or adjusted under 35 U.S.C. 154(b) by 0 days.

(21) Appl. No.: 14/948,210

(22) Filed: Nov. 20, 2015

(65) Prior Publication Data

US 2016/0077189 A1    Mar. 17, 2016

Related U.S. Application Data

(63) Continuation of application No. PCT/EP2014/060417, filed on May 21, 2014.

(30) Foreign Application Priority Data

May 22, 2013  (DE) .......................... 10 2013 209 462

(51) Int. Cl.
| | |
|---|---|
| *H04M 11/04* | (2006.01) |
| *G01S 5/02* | (2010.01) |
| *G01S 5/16* | (2006.01) |
| *G01C 21/16* | (2006.01) |
| *G01C 21/20* | (2006.01) |
| *G01D 5/12* | (2006.01) |

(Continued)

(52) U.S. Cl.
CPC .......... *G01S 5/0263* (2013.01); *G01C 21/165* (2013.01); *G01C 21/206* (2013.01); *G01D 5/12* (2013.01); *G01S 5/16* (2013.01); *H04W 4/043* (2013.01); *G01S 1/68* (2013.01)

(58) Field of Classification Search
CPC ....... H04W 4/008; H04W 4/02; H04W 4/021; H04W 4/026; H04W 4/027; H04W 4/028; H04W 4/043; H04W 64/00
USPC ......... 455/404.2, 456.1, 456.2, 456.3, 456.5, 455/414.1
See application file for complete search history.

(56) References Cited

U.S. PATENT DOCUMENTS

| | | |
|---|---|---|
| 8,412,183 B1 | 4/2013 | Kadous et al. |
| 2006/0125644 A1 | 6/2006 | Sharp et al. |
| 2008/0105065 A1 | 5/2008 | Lee et al. |

(Continued)

FOREIGN PATENT DOCUMENTS

| | | |
|---|---|---|
| EP | 1022578 A2 | 7/2000 |
| WO | 2012059542 A1 | 5/2012 |
| WO | 2013016875 A1 | 2/2013 |

*Primary Examiner* — Jean Gelin
(74) *Attorney, Agent, or Firm* — Michael A. Glenn; Perkins Coie LLP

(57) ABSTRACT

The relation between realization effort for a positioning system on the one hand and positioning accuracy on the other hand is improved by using, for determining the position of a mobile portable device, two sensors within the device, namely one sensor for detecting the movement of the mobile portable device as well as one sensor for detecting the approximation of the mobile portable device to one or several reference beacons, wherein, from a knowledge of a position of the one or several reference beacons by means of data provided by the sensor detecting the movement, the position of the mobile portable device relative to the one or several reference beacons is calculated.

14 Claims, 8 Drawing Sheets

(51) Int. Cl.
*H04W 4/04* (2009.01)
*G01S 1/68* (2006.01)

(56) References Cited

U.S. PATENT DOCUMENTS

| | | |
|---|---|---|
| 2008/0120062 A1 | 5/2008 | Lee et al. |
| 2008/0234935 A1 | 9/2008 | Wolf et al. |
| 2009/0140043 A1* | 6/2009 | Graves .................. G06F 19/327 235/380 |
| 2009/0201896 A1* | 8/2009 | Davis .................... H04W 84/18 370/338 |
| 2009/0204354 A1* | 8/2009 | Davis .................... H04W 84/18 702/89 |
| 2011/0087450 A1 | 4/2011 | Borenstein et al. |
| 2011/0143779 A1 | 6/2011 | Rowe et al. |
| 2011/0306323 A1 | 12/2011 | Do et al. |
| 2012/0007779 A1 | 1/2012 | Klepal et al. |
| 2013/0028609 A1 | 1/2013 | Staats et al. |
| 2013/0029685 A1 | 1/2013 | Moshfeghi et al. |
| 2013/0053056 A1 | 2/2013 | Aggarwal et al. |
| 2013/0085677 A1 | 4/2013 | Modi et al. |
| 2013/0244700 A1 | 9/2013 | Elias et al. |
| 2014/0046586 A1 | 2/2014 | Keal et al. |
| 2014/0291480 A1* | 10/2014 | Bruder .................... G01C 3/06 250/206 |
| 2016/0100290 A1* | 4/2016 | Smith .................. H04W 4/023 455/456.1 |

* cited by examiner $F_m$: errors of the motion sensors ($M_{mov}$) in (M)

MOBILE PORTABLE DEVICE AND POSITIONING

CROSS-REFERENCE TO RELATED APPLICATIONS

This application is a continuation of copending International Application No. PCT/EP2014/060417, filed May 21, 2014, which claims priority from German Application No. 10 2013 209 462.0, filed May 22, 2013, which are each incorporated herein in its entirety by this reference thereto.

BACKGROUND OF THE INVENTION

The present invention relates to a mobile portable device, such as a mobile portable communication device and to a concept for determining the position of the same.

Currently, a plurality of position detection or localization systems are known in conventional technology. The most common systems according to numbers are based on satellite-aided methods, which, however, necessitate the receipt of satellite radio signals and are thus frequently not usable or only to a limited extent inside buildings. Position detection systems for the usage within buildings are frequently based on methods necessitating field strength measurements of radio signals, such as GSM, Wi-Fi, Bluetooth or the same. Possibly, the cellular structure of such an arrangement of radio nodes within a network is also used for coarse localization. However, such a procedure frequently necessitates investments that bear an unfavorable proportion with respect to their usage. Also, these systems are frequently relatively inaccurate and allow, for example, no differentiation whether a position has been taken in front or behind an obstacle (wall, door, barrier, boundary line, etc.).

Other indoor positioning systems operate with beacons (based, for example, on infrared, radio and/or magnetism), which are located at previously known locations and thus enable identification of individual locations or their surrounding area, in particular by the limited range of signals emitted by the same. However, positioning is only possible at these locations and their surrounding areas defined by the limited range. A further type of local positioning works with sensors sensing the movement of a body, i.e. a person or an object, and can thus calculate its position in relation to a reference location. However, after a relatively short mission period, these systems become increasingly inaccurate, because over time and/or with increasing numbers of sensed movements, drift phenomenons have an effect, such that the inaccuracy of calculation becomes too great for practical usage.

SUMMARY

According to an embodiment, a mobile portable device may have at least one first sensor for detecting a movement of the mobile portable device and at least one second sensor for detecting the approximation of the mobile portable device to one or several reference beacons, wherein the mobile portable device is implemented to calculate, by using a knowledge of a position of the one or several reference beacons, the position of the mobile portable device relative to the one or several reference beacons by means of data provided by the at least one first sensor, wherein the at least one second sensor is implemented to receive a signal generated by the one or several reference beacons, and the at least one second sensor includes at least one magnetic field sensor and the signal generated by the one or several reference beacons is a magnetic field signal, or the signal generated by the one or several reference beacons is a signal varying temporally and locally with respect to field strength in a surrounding area of the one or several reference beacons, wherein the mobile portable device is implemented to correct, when passing a first reference beacon, the calculated position by comparison with a position of the first reference beacon and to calculate, between passing the first reference beacon and passing a second reference beacon, the position of the mobile portable device by means of the at least one first sensor relative to the corrected position with an inaccuracy increasing with increasing distance from the first reference beacon and to detect by means of the second sensor in what direction the mobile portable device passes a respective reference beacon, and to use the direction for correcting a currently calculated locomotion direction of the carrier of the device.

Another embodiment may have a system for local positioning of a mobile portable device with at least one first sensor for detecting the movement of the mobile portable device and at least one second sensor for detecting the approximation of the mobile portable device to one or several reference beacons, wherein the system includes the one or several reference beacons, and wherein the system is implemented to calculate, by using a knowledge of a position of the one of several reference beacons, the position of the mobile portable device relative to the one or several reference beacons by means of data provided by the at least one first sensor, wherein the at least one second sensor is implemented to receive a signal generated by the one or several reference beacons, and the at least one second sensor includes at least one magnetic field sensor and the signal generated by the one or several reference beacons is a magnetic field signal, or the signal generated by the one or several reference beacons is a signal varying temporally and locally with respect to field strength in a surrounding area of the one or several reference beacons, wherein the system is implemented to correct, when passing a first reference beacon, the calculated position by comparison with a position of the first reference beacon and to calculate, between passing the first reference beacon and passing a second reference beacon, the position of the mobile portable device by means of the at least one first sensor relative to the corrected position with an inaccuracy increasing with increasing distance from the first reference beacon and to detect by means of the second sensor in what direction the mobile portable device passes a respective reference beacon, and to use the direction for correcting a currently calculated locomotion direction of the carrier of the device.

Another embodiment may have a method for local positioning of a mobile portable device with at least one first sensor for detecting the movement of the mobile portable device and at least one second sensor for detecting the approximation of the mobile portable device to one or several reference beacons, wherein the method uses the one or several reference beacons and uses a knowledge of a position of the one or several reference beacons for calculating the position of the mobile portable device relative to the one or several reference beacons by means of data provided by the at least one first sensor, wherein the at least one second sensor is implemented to receive a signal generated by the one or several reference beacons, and the at least one second sensor includes at least one magnetic field sensor and the signal generated by the one or several reference beacons is a magnetic field signal, or the signal generated by the one or several reference beacons is a signal varying temporally and locally with respect to field strength in a surrounding area of the one or several reference beacons, wherein, when passing a first reference beacon, the calculated position is corrected by comparison with a position of the first reference beacon and between passing the first reference beacon and passing a second reference beacon, the position of the mobile portable device is calculated by means of the at least one first sensor relative to the corrected position with an inaccuracy increasing with increasing distance from the first reference beacon and it is detected by means of the second sensor in what direction the mobile portable device passes a respective reference beacon, and the direction is used for correcting a currently calculated locomotion direction of the carrier of the device.

According to another embodiment, a mobile portable device may have at least one first sensor for detecting a movement of the mobile portable device and at least one second sensor for detecting the approximation of the mobile portable device to one or several reference beacons, wherein the mobile portable device is implemented to calculate, by using a knowledge of a position of the one or several reference beacons, the position of the mobile portable device relative to the one or several reference beacons by means of data provided by the at least one first sensor, wherein the at least one second sensor includes one or several sensors for receiving an electromagnetic signal for detecting a Doppler shift resulting from a movement of the mobile portable device relative to the electromagnetic signal and for determining, based on the Doppler shift, motion direction, speed and/or acceleration of the mobile portable device.

Another embodiment may have a method for local positioning of a mobile portable device with at least one first sensor for detecting the movement of the mobile portable device and at least one second sensor for detecting the approximation of the mobile portable device to one or several reference beacons, wherein the method uses the one or several reference beacons and uses a knowledge of a position of the one or several reference beacons for calculating the position of the mobile portable device relative to the one or several reference beacons by means of data provided by the at least one first sensor, wherein the at least one second sensor includes one or several sensors for receiving an electromagnetic signal for detecting a Doppler shift resulting from a movement of the mobile portable device relative to the electromagnetic signal and for determining, based on the Doppler shift, motion direction, speed and/or acceleration of the mobile portable device.

Another embodiment may have a computer program having a program code for performing the inventive methods when the program runs on a computer.

The present invention is based on the finding that the relation between realization effort on the one hand and positioning accuracy on the other hand can be proved when, for determining the position of a mobile portable device, two sensors are used within that device, namely one sensor for detecting the movement of the mobile portable device and one sensor for recognizing the approximation of the mobile portable device to one or several reference beacons, wherein by knowing a position of the one or several reference beacons by means of data provided by the sensor detecting the movement, the position of the mobile portable device is calculated in relation to the one or several reference beacons. An infrastructure of reference beacons can be provided with very little effort and still allows a relatively high accuracy of localization by means of the proximity sensor of the mobile portable device, since the beacons merely serve to sporadically correct the calculation of the sensor sensing a movement and an area coverage or density of the one or several reference beacons can be kept small by using the sensor for detecting the movement of the mobile portable device between the passage of the mobile portable device between the one or several reference beacons.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
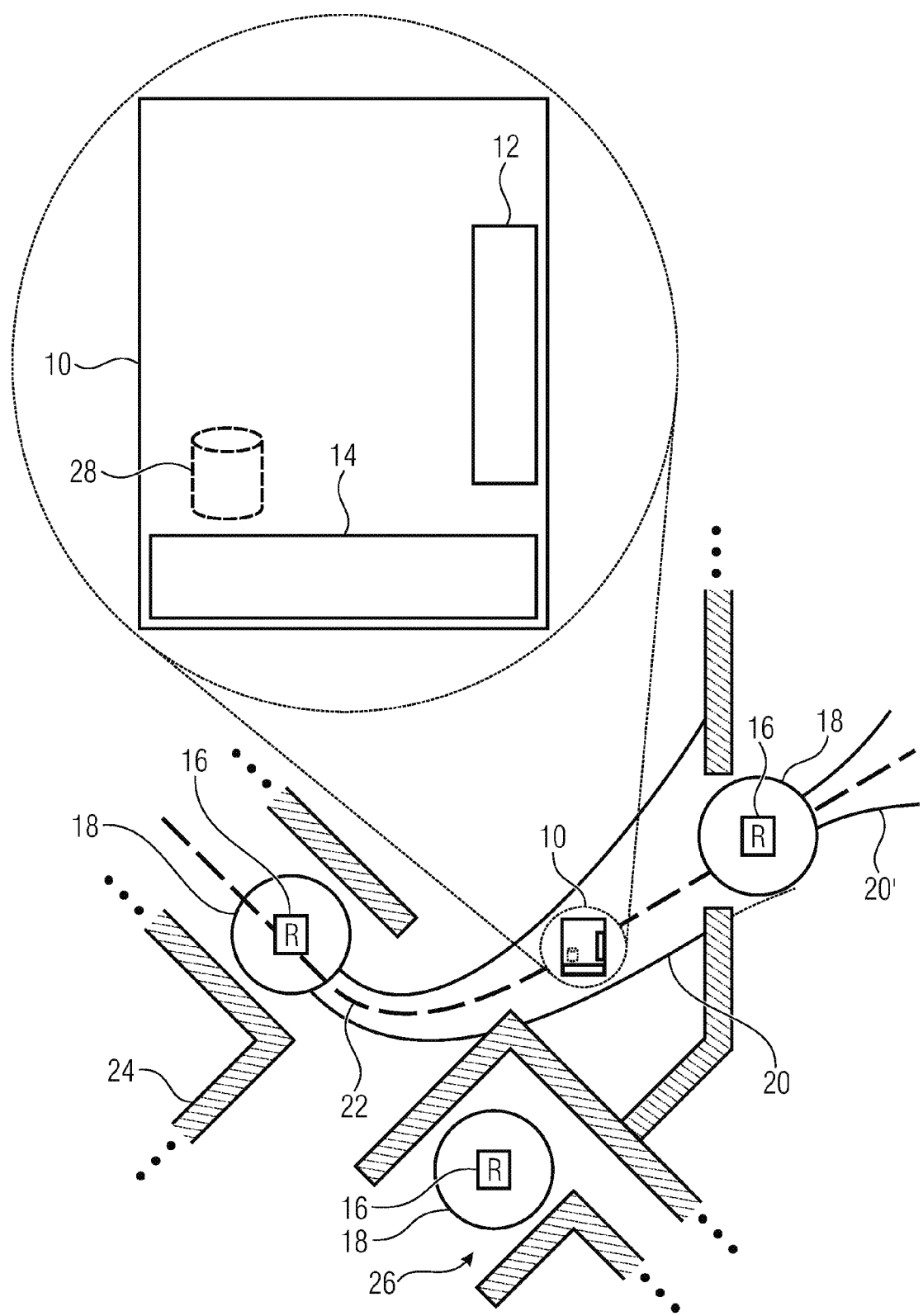
FIG. 1 is a schematic block diagram of a mobile portable device 10 as well as incorporation of the same within a system for its positioning according to an embodiment.

FIG. 1 shows a mobile portable device 10 according to an embodiment of the present application as well as an example of an environment surrounding the same having an infrastructure system of reference beacons, for illustrating the concept of determining the position of the mobile portable device 10. Device 10 and reference beacons together can also be considered as system for positioning.

The mobile portable device 10 is, for example, a mobile portable communication device for which a detailed embodiment will be described in FIG. 2. Basically, the device 10 can be any mobile portable device, such as a mobile phone, a PDA, a multimedia player or the same.

The mobile portable device is provided with one or several sensors 12 for detecting a movement of the mobile portable device 10 and one or several sensors 14 for recognizing the approximation of the mobile portable device 10 to one or several reference beacons 16, distributed in the surroundings of the device 10 that actually provide an infrastructure system which contributes, as will be described below, to the positioning of the device 10 or is used by the device for that purpose. In the following, for simplification reasons, frequently one sensor 12 and one sensor 14 are mentioned, but this does not exclude the option that two or more sensors of type 12 and/or two or more sensors of type 14 are involved.

As will be discussed in more detail below, the mobile portable device 10 is implemented to calculate, by using the knowledge of a position of the one or several reference beacons 16, the position of the mobile portable device 10 relative to the one or several reference beacons 16 by means of data provided by the sensor 12. Calculation within the device 10 is performed, for example, by a processing unit of the device 10, as will be illustrated exemplarily below with reference to FIG. 2.

In the following description, the individual components of the device 10 as well as their cooperation for determining the position of the device 10 will be described in more detail, but, in advance, with reference to FIG. 1, the concept for positioning will be illustrated briefly for simplifying the understanding of the following detailed discussion.

Positioning of the device 10 of FIG. 1 is based on a combination of using the positioning abilities as provided by sensors 12 and 14. It is advantageous that sensors 12 and 14 usually exist anyway in novel mobile devices. The sensor 12 is implemented, for example, as position and/or acceleration sensor and includes, for example, one or several gyroscopes and one or several accelerometers and optionally additionally one or several magnetometers. In that way it is possible to determine, from the data of the sensor 12, accelerations of the mobile portable device 10 in a coordinate system which is, for example oriented with respect to the gravitation field or the vertical and optionally additionally to the compass directions. In that way, it is possible that the device 10 detects relative movements of the mobile portable device 10 to its respective current position. In particular, the device 10 can detect, by means of the sensor, the locomotion of the carrier of the mobile portable device 10, such as the respective person carrying the device 10, for example in his or her hand, clothing or a bag. The device 10 evaluates, for example, cyclical patterns in the signals of the sensor 12 resulting from motion sequences in the locomotion of the carrier of the device 10, for example for detecting individual steps and for allocating a step size and a change of direction to these steps in order to be able to track, by combining the detected step size and directions, the actual position of the device 10, relative to a reference position existing at the beginning of the calculation, which is, as will be discussed below, obtained based on the reference beacons.

However, the positioning concept is not only based on evaluating the signal from the sensor 12. The resulting positioning is subject to error propagation due to the stepwise gradual locomotion change, based on which the inaccuracy of positioning based on the sensor 12 monotonously increases. Rather, the sensor 14 is additionally used for positioning.

According to the embodiments described below, the reference beacons 16 are beacons each emitting a signal with a finite range, such that the respective signal can be detected by the sensor 14 merely in a surrounding area 18 around the respective reference beacon 16. In that way, at least within the areas 18, the position of the device 10 can be determined by the sensor 14 at least with an accuracy corresponding to the range of the surrounding areas 18. In other words, the device 10 detects, for example the presence of the device 10 in surrounding areas 18 in that the sensor 14 detects the signal of the respective reference beacon 16. As it will be discussed in the following embodiments, it can be possible that the device 10, when the same passes a reference beacon 16, detects, in addition to a position of the device 10 from that passage, also a locomotion direction of the carrier of the device 10, i.e. derives information on the direction in that the device 10 passes the respective surrounding area 16.

As will be illustrated below, the signal of a reference beacon 16 can be a magnetic signal or a light signal or, for example, a low-bitrate short-distance transmission signal or a short-range radio signal. Reference beacons 16 with magnetic signals have advantages with regard to the relatively exact limitation of the surrounding area 18. This means the strength of the magnetic signal of such a reference beacon 16 drops quickly outside the surrounding area 18, to fall below a detection threshold of the sensor 14 in a very defined manner. More details in this regard are described in DE 102010043394 A1. However, it should be noted that it would basically also be possible that the reference beacon 16 is a passive member, wherein the device 10 comprises, in addition to the sensor 14, a signal generator, whose signal is reflected, for example, by the respective reference beacon 16 and detected by the sensor 14. Passive detection without signal emission would theoretically also be possible: a camera 14 as sensor 14 with allocated pattern recognition for recognizing the presence of a reference beacon in the field of view of the camera could be used as proximity detection. However, it is advantageous when the second sensor 14 is, for example, a magnetic field sensor and/or a light sensitive sensor and/or a low-bitrate short-distance transmission interface, i.e. a sensor for detecting a signal emitted by the beacon.

As has already been described, the device 10 uses both sensors 12 and 14 for positioning. This enables positioning of the device 10 between passing reference beacons 16 by means of the sensor 12. In this calculation, with increasing distance from the reference beacon passed last, the inaccuracy of the calculation increases. In FIG. 1, this increasing positioning inaccuracy is indicated by thin continuous lines 20 surrounding the actual path 22 along which the device 10 actually moves, and that becomes wider from beacon to beacon. Thus, the reference beacons 16 can be arranged such that the surrounding areas 18 are spaced apart from one another and that additionally the surrounding areas 18 are relatively small and hence allow relatively exact positioning in a simple manner. As will be discussed below, the distance can be enlarged by using further conditions given by the surroundings. In FIG. 1, the distance between the reference beacons 16 is so great that the positioning error added between two reference beacons 16 by positioning based on the sensor 12 is greater than the width of the surrounding area 18, which essentially mirrors the accuracy by which the position of the device 10 can be determined by using the sensor 14. When passing a reference beacon 16, the device 10 corrects the currently calculated position by comparison with a known position of the just passed reference beacon. The origin of the knowledge of the position of the just passed reference beacon 16 can be realized differently as will be described below. For example, an electric map comprising locations of the reference beacons 16 can be stored in the device 10 itself. Updating from outside via a server via a wireless interface is possible. Additionally, it would be possible that the signal of the reference beacon 16 itself includes information on the location of the reference beacon. Please refer to the following description for further alternatives.

Correction when passing a reference beacon 16, i.e. when passing the surrounding area 18 of the same provides, for example, that the device 10 corrects the currently calculated position that has been calculated by passing the last passed reference beacon 16 based on a sensor 12 by current updating by means of changes of direction and step sizes or the same, such that the same equals the location of the currently passed reference beacon 16 or another predetermined position within the surrounding area 18 of the currently passed reference beacon 16. At the time of this correction, the accuracy of positioning 10 is temporarily very exact. The same corresponds, for example, to the width of the surrounding areas 18. Up to the passage of the next reference beacon 16, the device 10 uses the sensor 12 again for calculating the position of the mobile portable device 10 relative to the just corrected position, wherein the inaccuracy increases with increasing distance from the currently passed reference beacon. "Relative to the just corrected position" does not exclude that the calculated and corrected positions are stated in an absolute coordinate system, but the calculation based on the motion sensor 12 takes place in that manner which merely updates a currently calculated position with continuously detected changes of motion direction and currently covered forward or backward sizes, such as step sizes, i.e. performs positioning in dependence on or relative to the position before the update.

Thus, the resulting positioning inaccuracy according to FIG. 1 increases from each passed reference beacon to the next and then immediately collapses at each beacon 16 to the inaccuracy defined by the reference beacons 16 and their surrounding area 18 and to increase again up to the next reference beacon. This is indicated in FIG. 1 at the top right reference beacon 16, in that the inaccuracy 20' continues "narrower" after the reference beacon, wherein it should be noted that for simplicity reasons in FIG. 1 the inaccuracy at the reference beacon 16 is illustrated smaller than the width of the surrounding areas 18, although this does not have to be like that in each embodiment, but could be like that.

Advantageously, the device 10 tracks the device 10 by means of positioning on an electronic map corresponding to the surroundings of the device 10. Beyond the distribution of three exemplarily shown reference beacons 16, FIG. 1 shows exemplarily further geographic circumstances in the surroundings of device 10, here, exemplarily in the form of walls 24 illustrated in a shaded manner, which hence define corridors, passages, doors, etc. and limit the degrees of freedom where the carrier of the device 10 can reasonably move. According to an embodiment, when calculating the position between passing the reference beacons 16 based on the sensor 12, the device 10 can use such geographic circumstances 24 in the electronic map for reducing the accuracy by the geographic circumstances 24 by respective limitations of the degrees of freedom of movement. Here, the fact is used that normally, for example, a carrier of the device 16 does not walk through walls, over tables, etc. Further examples for such "geographic circumstances" and the resulting limitations for the degrees of freedom of movement of the carrier of the device 10 will be discussed below.

The just mentioned electronic map, a section of which is illustrated in FIG. 1 at 26, is, for example, stored in an optional memory 28 of the device 10.

As has already been noted, further details will be described below, which can be combined individually or together with the above description. These details relate, for example, to the reference beacons 16 and the different options for distinguishing the reference beacons from one another for obtaining knowledge on their location. The embodiments range from "information-less signals" neither allowing distinguishability nor obtaining knowledge of their position to embodiments where the reference beacons 16 can both be clearly distinguished based on their signals and also the respective location can be determined merely based on the signal in that this location is transmitted with this signal. However, it should be noted that advantageous embodiments could also do with merely one reference beacon 16, whereby the desire for distinguishability would be obsolete. The above described "correction" would then be performed in each passing of exactly that reference beacon, in the same way as it can happen that with several beacons one and the same beacon is passed immediately twice. Additionally, embodiments described below will also illustrate that positioning or tracking of the followed path of the device 10 does not have to take place in the device 10 itself. Rather, the device 10 could form a system for local positioning of the mobile portable device 10 together with the infrastructure of reference beacons 16, wherein this system would then, for example, be implemented to perform the above described positioning based on the signals of the sensors 12 and 14 in the device 10, such as in an externally arranged processing unit, for example in a server, which obtains the signals of the sensors 12 and 14 in a wireless manner from the device 10 via a communication interface.

Before these details will be explained, it should be mentioned that when passing a reference beacon 16, not only correction of the currently calculated position of the device 10 could be performed, but that also a deviation between the currently calculated position of the device 10 and the position obtained by the correction, i.e. the extent of the position correction, could be used for using parameters of position calculation based on the sensor 12 between the currently passed reference beacon and the following reference beacon that will be passed next. For example, such a parameter could be used for scaling the step sizes allocated to the individual detected steps of the carrier of the device 10. Additionally or alternatively, such a parameter could be set by feedback by means of position correction concerning change of direction in order to reduce a continuous left or right drift when evaluating the signal of the sensor 12.

In the embodiments described below, the mobile portable device 10 is exemplarily a mobile portable communication device, which can be incorporated, as described above, in a self-calibrating infrastructure system for local positioning by using, in the described manner, a combination of positioning technologies, namely positioning based on a motion sensor on the one hand and positioning based on a proximity sensor on the other hand, whereby all in all, in a simple manner, highly accurate positioning and in particular also self-calibrating positioning can be obtained, which is easily applicable, in particular also inside buildings.

The components of the just described overall system can comprise, for example in the embodiment described below, the following components, wherein, first, reference is made to FIG. 2.

Figure 2:
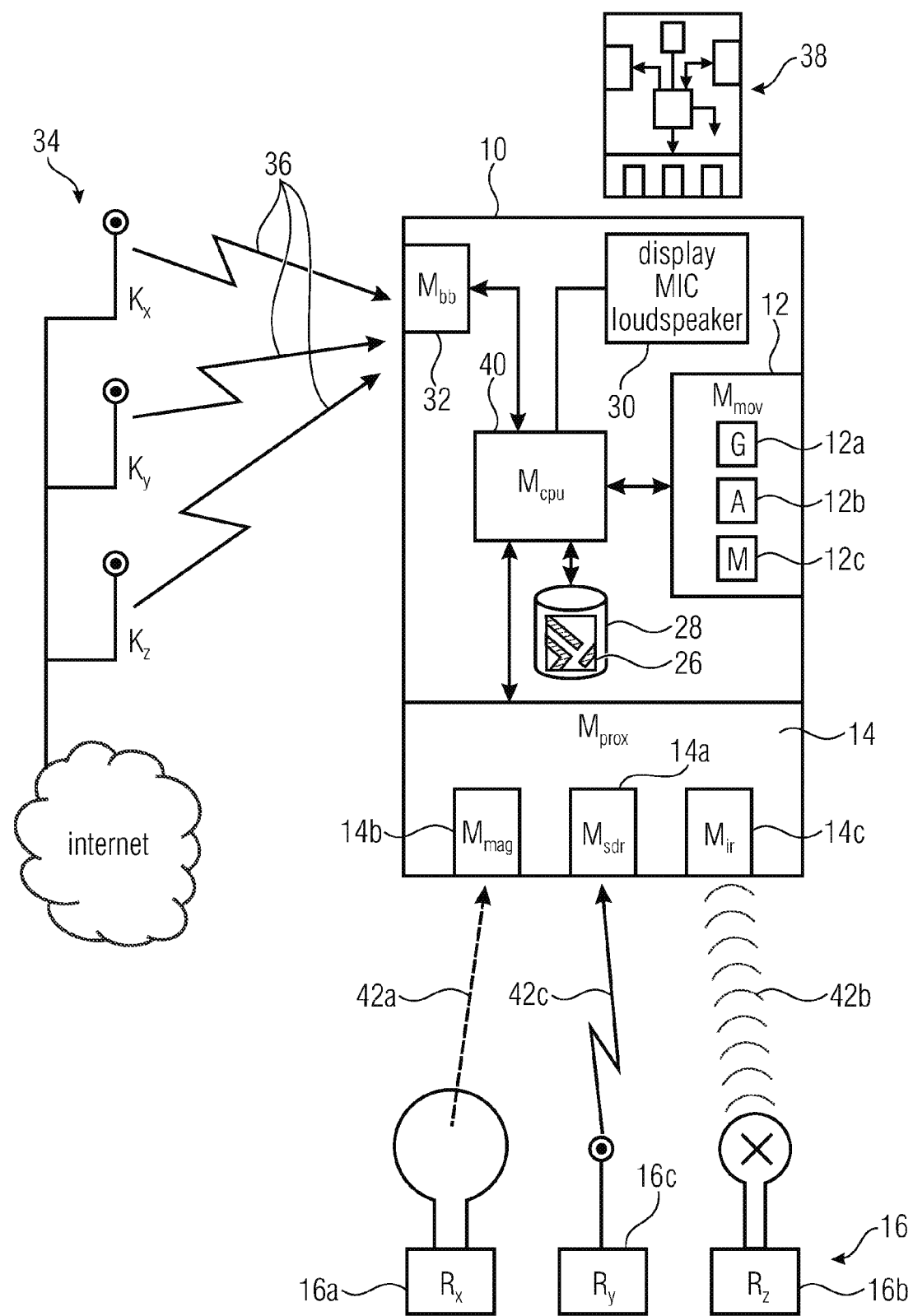
FIG. 2 is a schematic block diagram of a mobile portable device in the form of a mobile portable communication device according to an embodiment.

In the case of FIG. 2, the mobile communication device 10 is exemplarily provided with input and output means 30, such as a touch screen, a keyboard, a microphone, a display, an audio interface, and/or a loudspeaker, wherein such components are already common in so-called smartphones and the mobile portable communication device 10 can be such a smartphone.

Further, the mobile portable communication device 10 is provided with an optional high-bitrate transmission interface 32 for communication in a communication network 34.

Exemplarily, the communication network 34 has several network nodes $K_x$, $K_y$ and $K_z$. As will be described below, the device 10 could use the wireless connections 36 to these network nodes optionally for coarse triangulation of the position of the device 10 between at least two, possibly also more transmitters or network nodes $K_x$, $K_y$ and $K_z$ of the network 34 via the high-bitrate transmission interface 32. In a further implementation, the interface 32 could further be used by the device for a connection to further processing units or memories within a higher-level overall system, indicated exemplarily at 38 in FIG. 2.

Further, the device 10 of FIG. 2 includes a proximity sensor 14 for detecting the approximation of the device 10 to a respective reference beacon, which can be formed, as already described above, for example, as radio, light, and/or magnetism source, which is why the sensor 14 as illustrated in FIG. 2 can be implemented as a lower-bitrate radio-based short-distance transmission interface or short-distance radio interface 14a and/or at least one magnetic field sensor 14b and/or as at least one optical sensor or light sensor 14c for detecting light, for example infrared radiation. FIG. 2 also shows that the device 10 comprises at least one sensor 12 for detecting the movement of the mobile device 10, for example in the form of position and/or acceleration sensors.

Further, the device 10 includes at least one processing unit 40. FIG. 2 shows further that the device 10 comprises a memory 28. The processing unit is communicatively connected to the interface 32, the input and output means 30, the at least one sensor 12 and the at least one sensor 14 as well as the memory 28 and performs, for example, processing of the information obtained from the sensors 12 and 14, but also from the input means 30 and the transmission interface 32, as well as the information to be passed on to the output means 30 and the transmission interface 32.

FIG. 2 also shows examples for reference beacons 16. As described above, reference beacons can generate radio, light, infrared and/or magnetic field signals. Accordingly, a reference beacon can be a magnetic reference beacon 16a, a light reference beacon 16b or a short-distance communication interface or a short-distance radio reference beacon 16c. As described above, reference beacons are, for example, located in a stationary manner at specific intervals or at geographically sufficiently accurately known reference points, such that their signal(s) as well as possibly incorporated information can be received by the at least one proximity sensor 14.

As has already been described above, for positioning the device 10, the knowledge of the geographic positions of the reference beacons 16 is used. The same are known to the system to a sufficiently exact extent. This means, for example, that at least one electronic map 26 exists, where, among others, the positions of the beacons 16 are shown. Possibly, the maps can include further geographic information, such as previously mentioned geographic circumstances, part of which are not only walls 24 as shown exemplarily in FIG. 1, but also ground plans of buildings, furniture included therein, such as shelves on a sales floor or the position of transmitters $K_x$, $K_y$ and $K_z$ of the communication network 34. The reference beacons 16 generate a radio signal 42c, light signal 42b, which can, for example, be an infrared signal, and/or magnetic field signal 42a, which is used for localization purposes as described above.

As described above, the electronic maps or the electronic map 26 can be stored in the device 10, for example the memory 26, which provides the same with the ability of performing the above-described positioning by combining the signals of the sensors 12 and 14, for example as stand-alone device, in a fully functional manner. Alternatively, as already indicated above, it is possible that the map 28 is stored on a server of a higher-level overall system (not shown in FIG. 1), which allows particularly flexible data updates, such as when changing the interior design in a building, such as when changing the arrangement of shelves or the same.

The optional communication network 34 shown in FIG. 2 can, for example, be radio, light and/or infrared based. It can provide the device 10, for example, with access to or communication with further processing units, such as a processing unit of a system, so that the above described positioning is performed by passing on the signals of the sensors 12 and 14 to the outside externally to the device 10, or to other mobile devices, one of which is shown exemplarily at 38 in FIG. 2.

The mobile portable communication device 10 of FIG. 2 can, for example, be a modern mobile phone, a tablet computer or a portable computer. However, the same can also be a dedicated device only for positioning.

The transmission interface 32 can, in particular, be a radio interface according to international standards, such as a mobile radio interface, such as a GSM interface or also an interface for local communication, such as Wi-Fi.

As far as the lower-bitrate short-distance transmission interface 14a is concerned, the same can also be based, for example on Bluetooth, ZigBee, Z-Wave, ANT or similar technologies.

In connection with the actual localization task by using the communication of the signals of the sensors 12 and 14, for example, the high and lower bitrate network structures 34 and 16c can be used. The same have transmission interfaces $K_x$, $K_z$ or 16c having a cellular network organization, such that coarse localization can take place in that it is determined in what cell of the network the device 10 resides. As stated briefly above and explained in more detail below, this coarse localization, for example, can be used for distinguishing different reference beacons from one another or for identifying a currently passed reference beacon.

As illustrated in FIG. 2, the sensor 12 can include sensors for detecting the movement of the mobile device 10 in the form of motion sensors, such as one or several gyroscopes 12a, one or several accelerometers 12b and/one or several electronic compass sensors or magnetometers 12c. The sensors 12a-12c are used by the processing unit 14 either individually or in combination coupled via algorithms. The signals of these different sensors 12a-12c are subject, for example, to so-called "fusing" for describing the movement of the device 10 within a coordinate system oriented, for example, to the vertical and optionally to the main compass directions, and is optimized for accuracy optionally, for example, with respect to the redundancies existing among the sensors by skillful selection and calculation.

The magnetometer or magnetic field sensor 12c, can, for example, be a Hall sensor, wherein the same responds, for example, only to one or also to several spatial field directions.

A program which evaluates the signals of the sensors 12 for detecting the movement of the device 10 and calculates a relative movement of the device 10, namely, for example, direction, speed as well as possibly a distance in connection with an allocated time difference, can be installed, for example, on the processing unit 40. Due to the inaccuracies of the sensors 12a-12c, the calculation is relatively inaccurate and the errors indicated in the following FIG. 6 by $F_m$ are added over time and the number of movements or changes of direction, as indicated in FIG. 1 by reference numbers 20 and 20'. As already mentioned, it is advantageous when the reference beacons 16 emit spatially limited signals 42a-42b by means of, for example, radio, magnetism and/or light, for covering, as shown in FIG. 1, areas 18 around the respective reference beacon 16, wherein, when distributing the reference beacons 16, it is taken care that signals generated by two reference beacons 16 do not locally overlap for the purpose of verifiability or detectability by the proximity sensor 12.

As described above, it would be possible that embodiments of the present application manage with only one reference beacon. However, if several reference beacons are used, different options exist for distinguishing the reference beacons from one another for localization or positioning of the mobile portable device 10, i.e., for identifying the same when the device 10 passes the respective reference beacon. The embodiments range from those where the respective reference beacon merely emits a signal which cannot be distinguished from other reference beacons, to embodiments where the reference beacons are distinguished based on their signals, i.e., the signals include information allowing unique identification of the respective reference beacon. In the case that the signal of a reference beacon comprises identification information, it can be the case that the same also includes information on the position or the location of the reference beacon itself, such that looking up in the electronic map 26 for looking up the location of the reference beacon based on the identity of the same in the map 26 becomes obsolete.

In other words, the signals of the reference beacons 16 in a simplified embodiment can be merely generated for indicating the proximity to any reference point, namely the location where the respective reference beacon is arranged. In this case, other references can be used for distinguishing the reference beacons from one another. According to an embodiment described below, for example, the cell structure of the communication network 34 can be used for performing coarse localization which then allows unique allocation of a signal detected by the proximity sensor 14 to one of several reference beacons 16 which do not differ, for example, based on their signals, since, for example, merely one reference beacon 16 resides in a current cell of the communication network 34. In this case, positioning of the device includes, for example, coarse localization of the device 10 via, for example, the communication network 34, whereupon in the case of detecting a signal 42*a-c* of a reference beacon 16, the referenced beacon is identified, by looking up in the electronic map 26 in the coarsely localized area where the device 10 resides according to the coarse localization, i.e., the reference beacon 16 lying within this coarsely localized area is detected.

In a further implementation, the signals of the reference beacons 16 can also include information allowing, in particular, identification, such as unique identification of a specific beacon 16 within a group of several reference beacons 16 or within a respective group of several reference points where these reference beacons 16 are arranged. The information can be a digital but also an analog signal. The information in the signals of the reference beacons 16 is, for example, merely a nominally scaled indexing for distinguishing the reference beacons 16. In a further implementation, the signals of the reference beacons 16 can also include information indicating the location of the respective reference beacon 16, i.e., the reference position, whereby the reference beacons 16 could also be distinguished, and whereupon, at the same time, knowledge on the reference position of the respective reference beacon 16 would already be obtained without having to separately look up, for example, in the map 26. Apart from the location information, direction information could be included in the signal of a respective reference beacon 16. This will be discussed below. In particular, it is possible that a reference beacon 16 is arranged such and outputs a signal such that the proximity sensor 14 can further infer information therefrom in what direction the device 10 has passed the respective reference beacon 16. For details please see the following description. First, it should be sufficient to state that the signals of the reference beacons 16 can also include information including an absolute or relative direction of the device 10 when passing the respective reference beacons or such an information results when passing the reference beacon. Possibly, the signal is merely an identification-less signal that is also used for the reference beacons 16, and only when passing the same such direction information results for the sensor 14. As has just been mentioned, for further details please see the following description.

The above mentioned signals 42*a*-42*c* of the reference beacons 16 are received by the proximity sensor 14 in the mobile device 10, wherein the information in the embodiments described herein is extracted directly in the portable device 10 by means of the processing unit 40.

As has already been mentioned, the communication network 34, can, for example, be a mobile radio network or a local wireless data transmission network.

In summary, FIG. 2 shows a device 10 that can be incorporated in a system for positioning of the device 10 and here comprises exemplarily one or several gyroscopes 12*a*, one or several accelerometers 12*b* and/or one or several magnetometers 12*c* as motion sensor 12. As proximity sensor 14, the device 10 includes exemplarily one or several magnetometers, one or several short-distance communication network positions and/or one or several light sensors, wherein it should be noted that proximity sensor 14 and motion sensor 12 can share one or several magnetometers. As examples of reference beacons 16, magnetic, light-based and short-distance communication interfaces have been shown, wherein it should be noted that reference beacons 16 of merely one type or also of different types can exist.

After having coarsely described the function and the structure of a device 10 with reference to FIG. 2, according to an embodiment, the mode of operation will be described in more detail with reference to the following figures. These further details apply to all above described embodiments individually or in combination for reaching further embodiments, starting from these above-described embodiments.

The at least one mobile portable device 10 is carried by a person or mounted on objects, such as a shopping trolley, a walking aid, a wheelchair or the same. Reference beacons 16, such as, for example, at least two but possibly also merely one, are mounted in a grid. The grid results, for example, from the desired local resolution (granularity) of the system as well as from the absolute accuracy of positioning by the at least one motion sensor 12 for detecting the movement of the mobile portable device 10. The higher the desired granularity or the more inaccurate the results of positioning by the at least one sensor 12 for detecting the movement of the device 10, the higher, for example, the density or number of reference beacons necessitated for obtaining a predetermined absolute or relative localization accuracy, and the density or number is selected accordingly.

Specific spatial circumstances as described above exemplarily with reference number 24 in FIG. 1 can be used, for example, for reducing the number of reference beacons 16. If, for example, the movement in a specific area is only possible in one axis, such as in a long corridor of a building or between goods shelves in a supermarket, as will be discussed below with reference to FIG. 5, the accuracy of the algorithm evaluating the information of the at least one sensor 12 for detecting the movement of the device 10 can be higher than in surroundings allowing any movement. If these geographic circumstances are known to the processing unit 40 directly or indirectly via a communication network 34 and further processing units 38 or memories in the form of a map 26 accessible therein, the same can be incorporated in the calculation of the position in an implementation.

Figure 3:
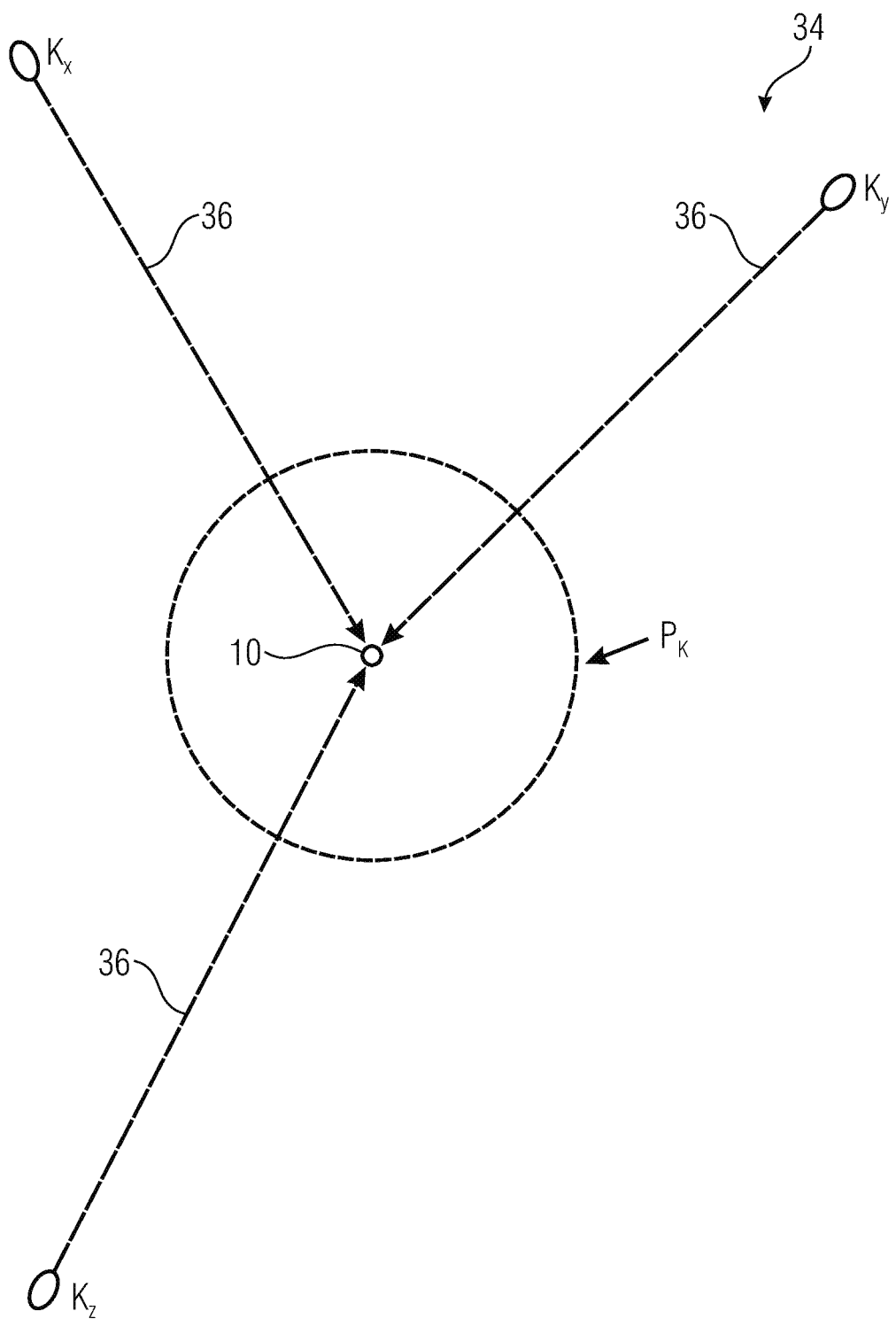
FIG. 3 is a schematic illustration of the option of coarse localization of the mobile portable device by means of communication network according to an embodiment.

Further, the optional communication networks 34 can be used for determining an approximate position whose accuracy is increased by the knowledge of the positioning of the reference beacons 16. This has been indicated above by reference to "coarse positioning". For example, the mobile portable device 10 calculates the position of the device 10 first approximately based on a triangulation by means of measurements of communication networks of transmitters $K_x$, $K_y$, and $K_z$ of the communication network 34 whose positions are indicated, for example, in the map 26. This is exemplarily shown in FIG. 3 which indicates the coarse position indication $P_K$ obtained by means of coarse localization or localization of the communication network 34 of the device 10 and is indicated in FIG. 3 by $P_K$. "Coarse" positioning is to indicate that the position indication $P_K$ obtained by this coarse positioning is still provided with an insecurity factor or an inaccuracy that is greater than a target accuracy as obtained by combining the signals from the sensors 12 and 14. On the other hand, coarse localization is sufficient for clearly identifying a reference beacon 16 out of several reference beacons, as will be discussed below based on the following FIG. 4.

Figure 4:
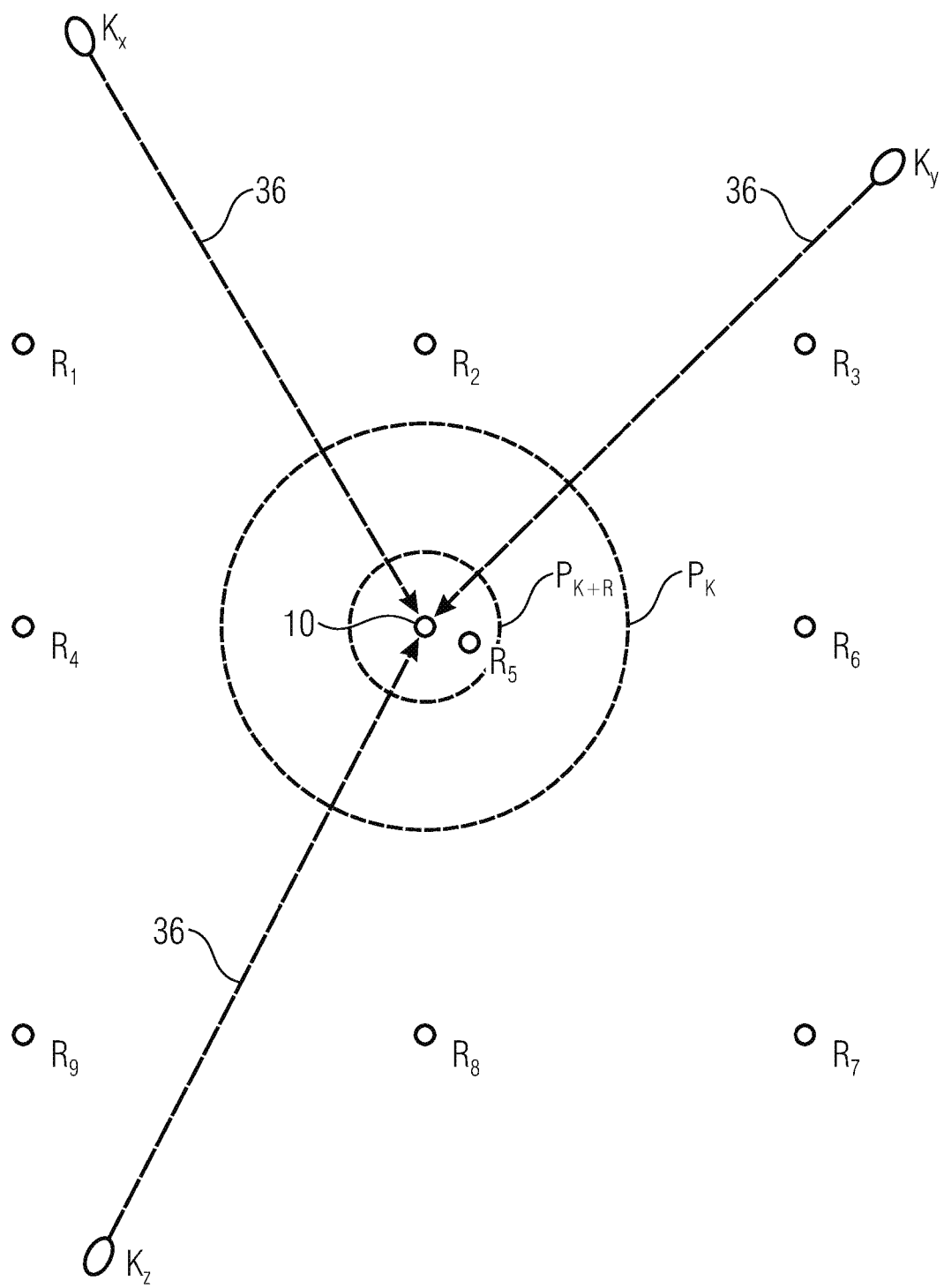
FIG. 4 is a schematic illustration of the usage of a coarse localization according to FIG. 3 for supporting the distinguishability or identification among distributed reference beacons according to an embodiment.

When the mobile portable device 10 passes the closest or currently passed reference beacon 16, namely $R_5$ in the case of FIG. 4, the mobile portable device 10 can compare a significantly more exact position with the map 26. The more exact position is indicated in FIG. 4 by $P_{K+R}$, in other words, it is possible to identify a reference beacon out of the several reference beacons, namely the reference beacon $R_5$ out of the exemplary nine reference beacons $R_1$-$R_9$ shown in FIG. 4 by means of coarse positioning, as illustrated by $P_K$, and thereupon the transmission area 18 of exactly that reference beacon $R_5$ determines the inaccuracy of the position indication $P_{K+R}$. In the following, it should be noted that coarse positioning as illustrated by $P_K$ does not necessarily have to be obtained by triangulation but that it might merely be determined in the cell of what transmitter out of transmitters $K_x$, $K_y$, and $K_z$ of the communication network the device 10 resides.

Figure 5:
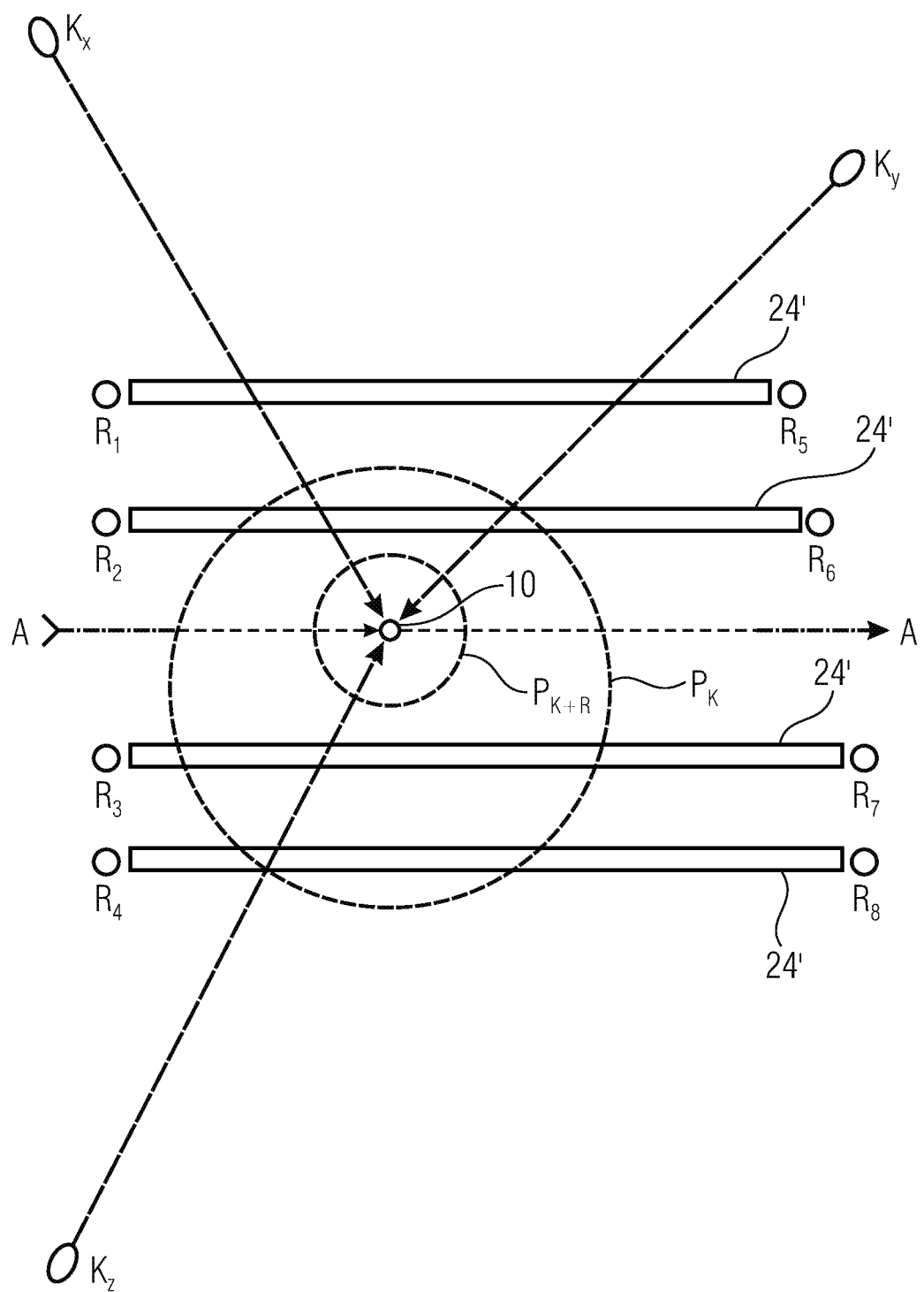
FIG. 5 is a schematic illustration of the usage of geographic circumstances for supporting the position calculation based on the motion sensor according to an embodiment.

After the device 10 has passed a reference beacon 16, the sensor 14 as described above is used for calculating further positions relative to the reference point, continuously up to detecting an approximation to another or next reference beacon 16, such as the reference point of the currently passed reference beacon or at least a corrected position of the device 10 as obtained by the proximity sensor 14, wherein the positioning by means of the sensor 12 or the resulting calculated position is indicated by $P_{K+R+m}$ in FIG. 5, wherein FIG. 5 shows, in comparison to FIG. 4 that shows the device in surroundings without additional geographic circumstances surrounded by merely a distribution of communication network nodes $K_x$, $K_z$ and reference beacons $R_1$-$R_9$, the device 10 in surroundings that, in addition to the communication nodes $K_x$-$K_z$ and the reference beacons $R_1$-$R_8$ comprise geographical circumstances, here exemplarily in the form of shelves 24', wherein FIG. 5 illustrates exemplarily with a dashed dotted line a-.-.-.-.-.-a the above-mentioned aspect, according to which the degrees of freedom of movement of the device 10 when moving between the reference beacons $R_1$-$R_8$ is exemplarily limited to a straight path or an axis of movement running along a corridor passing between two shelves 24'. In the latter respect, FIG. 4 shows a state where the device 10 is currently in a surrounding area of a reference beacon $R_5$, consequently, in that situation correction of the position is possible as determined up to this reference beacon $R_5$ based on the motion sensor 12, while FIG. 5 shows a situation where the device 10 is between reference beacons $R_1$-$R_8$, such that the sensor 14 does not receive the signal of any reference beacon and performs positioning relative to the corrected position of the last passed reference beacon, such as $R_2$ in FIG. 5, for so long until the sensor 14 again receives the signal of a reference beacon, such as $R_6$ or $R_7$ of FIG. 5, which, in turn, means that the inaccuracy of the position indication $P_{K+R+M}$ in FIG. 6 becomes continuously greater from passing the last passed reference beacons $R_2$ to passing the next reference beacon, as indicated in FIG. 1 by reference numbers 20 or 20'.

Again, in other words, as shown in FIG. 3, the portable mobile device 10 can measure, for example at the transmission interface 32 (cf. FIG. 2), the received signal strengths of the sensor signals 36 of the communication sensor $K_x$, $K_y$, $K_z$. Then, the approximate position is calculated, for example in the processing unit 40 of the device 10 by using the map 26, with an inaccuracy illustrated in FIG. 3 by the approximately circular limited area $P_K$. When no further information is included in the signal of reference beacons $R_1$-$R_9$, as discussed with reference to FIG. 4, the processing unit 40 of the device 10 can, with the help of the map 26, calculate the exact position of the device 10 with an inaccuracy illustrated by the approximately circular limited area $P_{K+R}$, when, for example, only one reference beacon $R_1$-$R_9$ each resides within the inaccurate position, which is illustrated by the approximately circular limited area $P_K$. In other words, reference beacons $R_1$-$R_9$ are distributed such that independent of the current position of the device 10 only one reference beacon 16 resides within the area $P_K$.

If no communication network 34 exists, as an alternative to using the coarse localization by means of this network, information on the identity of the respective beacon 16 can be added to the signals of the reference beacons, for distinguishing the reference beacons, wherein then the processing unit 40, for example, determines the exact position $P_R$ immediately. The accuracy of $P_R$ and $P_{K+R}$ would then the identical.

As described above in the context of elements 24 and 24', if further information on geographic circumstances is included in the map 26, such as the location of goods shelves 24', the same can be used for reducing the inaccuracies of the positions of the device 10 obtained from the signal of the motion sensor 12 and the optional triangulation of the communication network transmitters $K_x$, $K_y$, $K_z$, since certain degrees of freedom of movement of the mobile portable device cannot be used or only to a limited extent, or the deviations of the measurement values can be limited by considering the geographic characteristics.

The reference beacons 16 are disposed at a distance to one another which depends on the accuracy of the at least one motion sensor 12 for detecting the movement of the mobile portable device, the geographical circumstances 24, 24' optionally used for positioning, and the granularity of positioning by means of, for example, triangulation of transmitters of the communication network 34. A further relation of the number of reference beacons 16 can, for example, be allowed while maintaining the accuracy of positioning, wherein, for example, reference is made to reference beacons $R_1$ to $R_8$ of FIG. 5. Further, it would be possible to simplify the signals emitted by the reference beacons 16. If an approximate position is determined by the at least one communication network 34, as described above, the mere presence of an "information-less" signal of a reference beacon 16 as described above could calibrate the position and optionally the direction by means of the map 26 when the interval of the reference beacons 16 is greater than the inaccuracy of positioning by means of triangulation by using the communication network 34.

Figure 6:
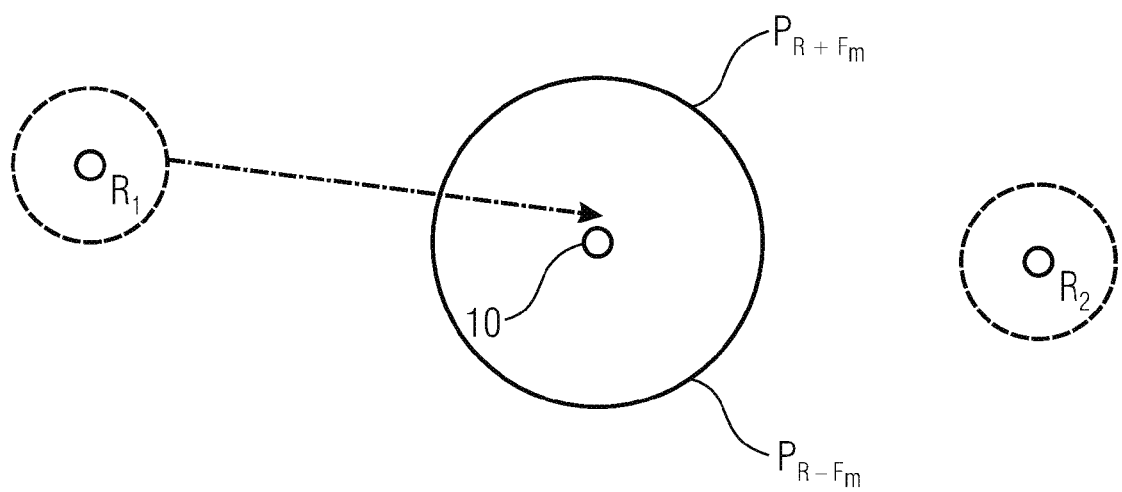
FIG. 6 is a schematic illustration of the characteristic of positioning based on the motion sensor between passing two reference beacons for illustrating the increasing inaccuracy of the calculated position according to an embodiment.

As has already been described, with increasing distance of the mobile portable device 10 to a reference beacon 16, the error $F_m$ of positioning based or by means of the motion sensor 12 increases. This is illustrated in FIG. 6 which illustrates the device 10 on the way from passing a reference beacon $R_1$ to a reference beacon $R_2$, wherein the device 10 resides exactly between these reference beacons, wherein the current error or the current inaccuracy of the calculated position based on the motion sensor 12 is illustrated by the circle $P_{r-Fm}$. This means the resolution of the position at a reference beacon, namely $P_R$ is highest and is increasingly reduced $P_{R-Fm}$ until a reference beacon is passed again, namely $R_2$ in FIG. 6, and the system can calibrate again.

For guaranteeing the system granularity, i.e. continuous or minimum resolution in space, the above described reference beacons 16 can be disposed at a sufficiently low distance. This distance is calculated, for example, by adding the maximum error of positioning by means of the motion sensor 12 for detecting the movement of the device 10 in connection with the map 26 and can lie below the granularity of the system resolution.

In other words, FIG. 6 shows that the distances between two reference beacons 16, here exemplarily $R_1$ and $R_2$ can be selected such that the error of relative positioning that is adding up, namely $F_m$ by the motion sensor 12 and the residual inaccuracy of reference beacons 16, namely $R_1$ and $R_2$ in FIG. 6 results in positioning $P_{R-Fm}$ which ensures the desired system accuracy.

As mentioned above, for simplifying the system further and for reducing the number of reference beacons in a further embodiment of the application, assumptions can be made on typical motion sequences of the object to be localized, namely for example the movement model of the carrier or person carrying the device 10 in general, i.e., the size of the carrier or person carrying the device 10 can be used. If this information is incorporated into the algorithms on the processing unit 40, which are used for positioning between the reference beacons 16 based on the motion sensor 12, for example, localization accuracy can be increased or the average system accuracy can be increased. Then, for example, only few objects showing untypical behavior have higher positioning errors, such as when the carrier of the device 10 is jumping instead of walking according to the motion model.

Figure 7:
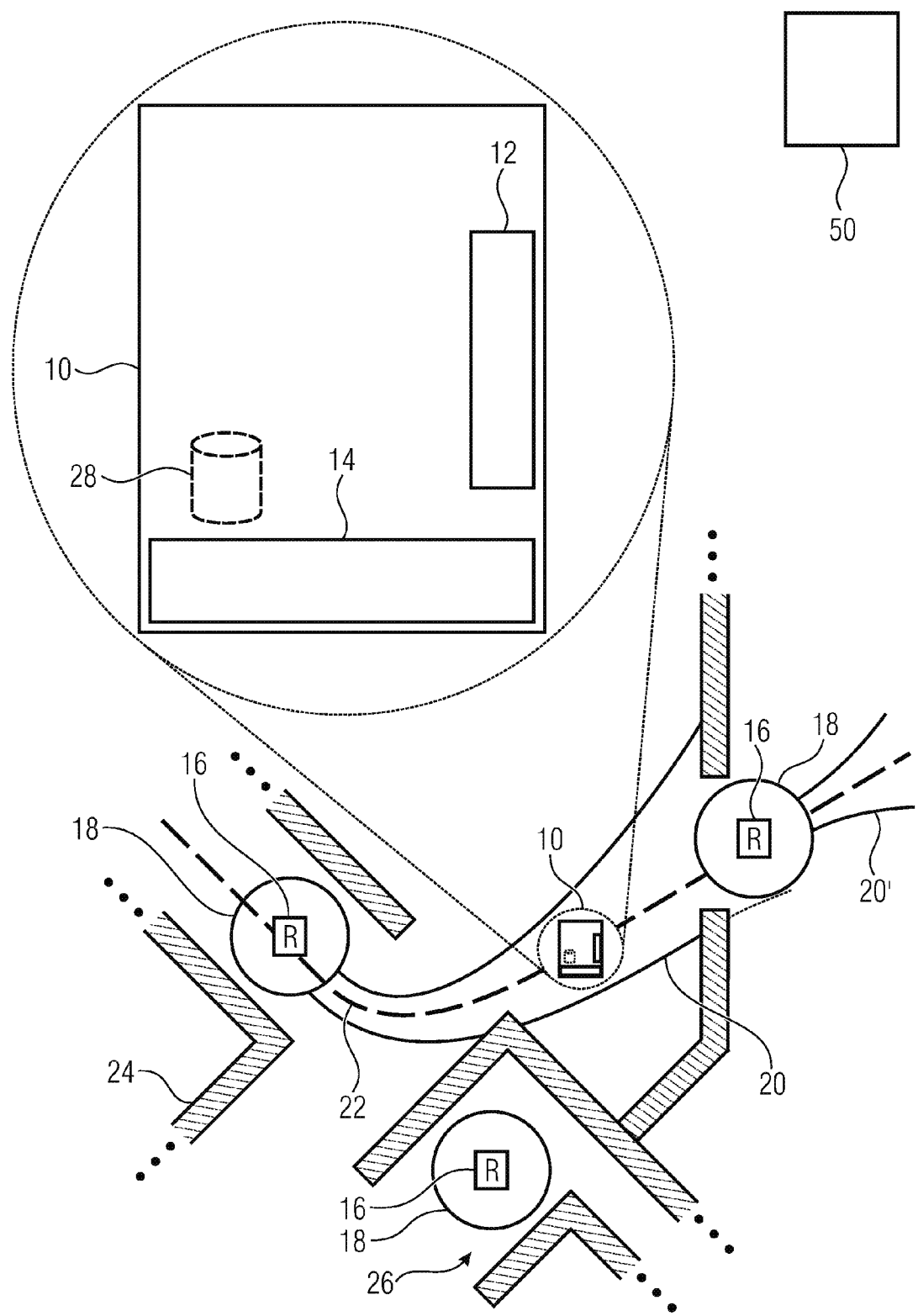
FIG. 7 is a schematic block diagram of a system modified compared to FIG. 1 in that positioning is performed externally based on motion and proximity sensors according to an embodiment.

For completeness sake, FIG. 7 again shows the above briefly mentioned option according to which actual positioning by combining the signals from position sensor 12 and proximity sensor 14 of the device 10 is not performed within the device or by the device 10 itself but by an external device or in an external processing unit 50 which receives the signals from the sensors 12 and 14, for example via an interface, such as interface 32 and uses the location determined in that manner either for its own purposes, such as for tracking the device 10, or additionally or alternatively transmits the specified location back to the device 10, such as for displaying at the device 10 for a user or carrier of the device 10.

Figure 8A:
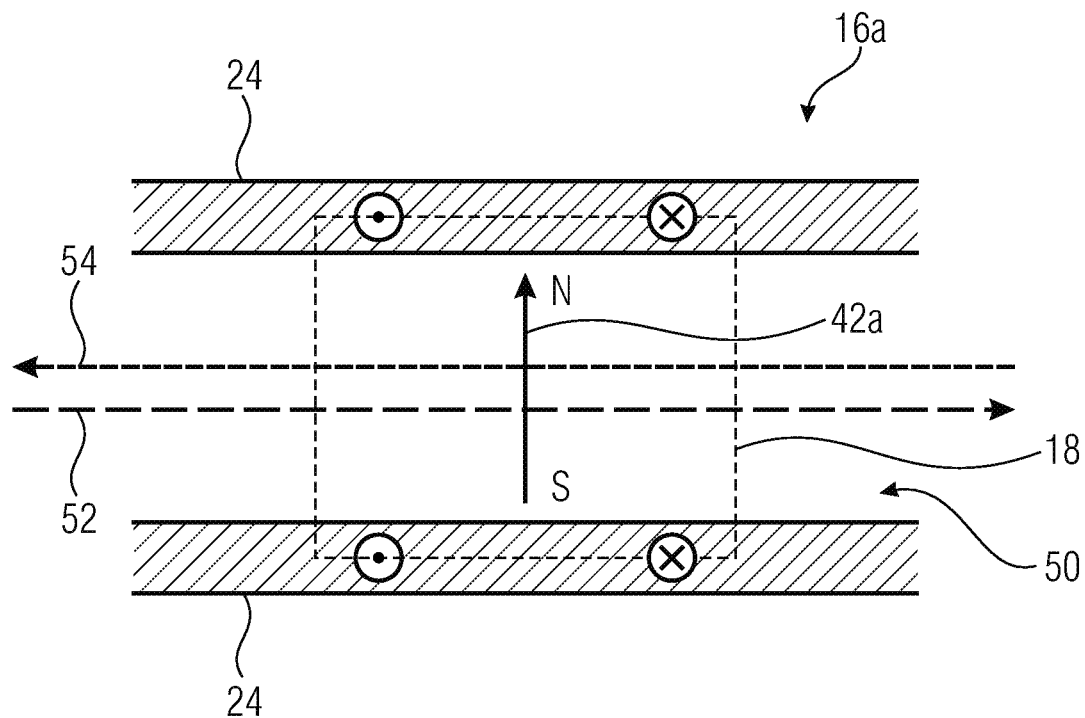
FIGS. 8A, 8B is a schematic illustration of magnetic reference beacons allowing, in addition to positioning, determination of the direction of passing the respective reference beacon.
Figure 8B:
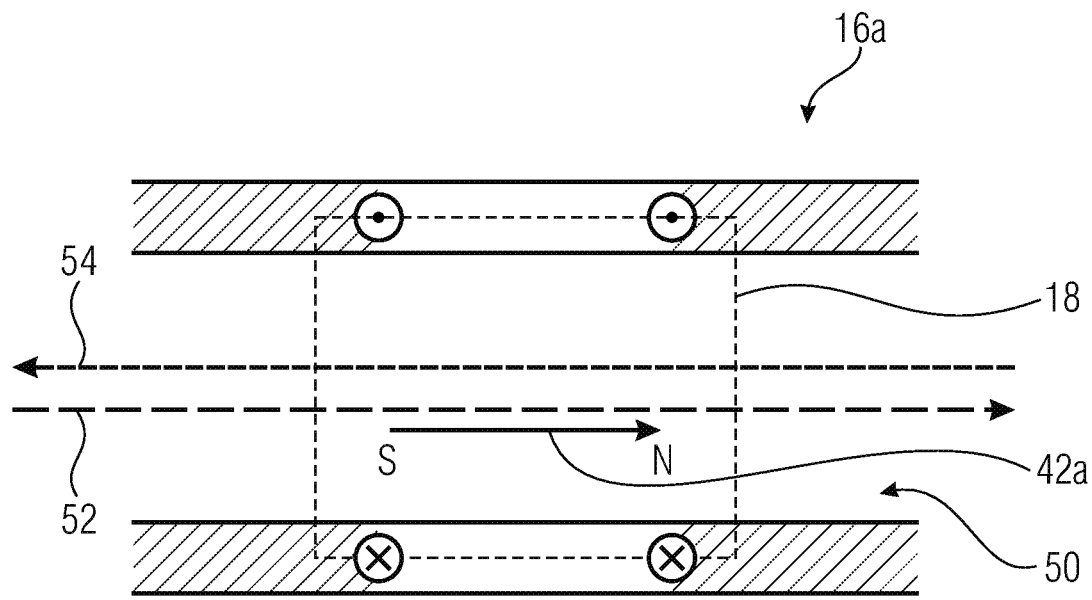

Finally, for completeness sake, FIGS. 8A and 8B show the option already mentioned above that a reference beacon 16 also offers the option of detecting, via the sensor 14, in what direction the device 10 currently passes this respective reference beacon. FIGS. 8A and 8B relate exemplarily to magnetic reference beacons 16a. The reference beacon 16a of FIGS. 8A and 8B includes a current-carrying coil superposing an artificial magnetic field 42a on the earth's magnetic field, which represents the signal of the respective beacon 16a. The signal 42a could, for example, be amplitude-modulated with a modulation frequency that has, for example, a very low frequency, such as a frequency of less than 50 Hz, wherein switching is performed between, for example, non-current-carrying state and current-carrying state where, for example, the magnetic field direction is the same. In FIG. 8A, the coil is installed in walls 24 such that the magnetic field 42a of the beacon 16a runs transversal to a corridor 50 between the walls 24 which is defined by the walls 24. Due to the characteristic of coils according to which their magnetic field is greatest within the coil and drops extremely quickly at the outside, the surrounding area 18 of the beacon is essentially only within the corridor 50 between the winding in the one wall 24 and the winding in the other wall 24 of the coil of the beacon 16a. Additionally, it can be assumed that the device 10 or the carrier of the device 10 passes the corridor either in one direction 52 or in the other direction 54. Depending on the direction, the north pole of the artificial magnetic field 42a is either directed towards the left relative to the locomotion direction or to the right relative to the locomotion direction. Depending thereon, the direction 52 or 54 in which the device 10 moves from the reference beacon 16a can be inferred, wherein this information can be used for correcting the currently calculated locomotion direction of the carrier of the device 10.

FIG. 8B shows an option according to which the coil of the reference beacon 16a is incorporated in the walls 24 such that the magnetic field 42a points longitudinal to the corridor 50, namely exemplarily along the direction 52 and opposite to the direction 54. In other words, in the case of FIG. 8A, the windings each run within a wall 24 and in the case of FIG. 8B run such that the corridor runs through the windings. Even in FIG. 8B, when passing the beacon 16a, it can be detected based on the signal from the proximity sensor 14 whether the artificial magnetic field 42a points in locomotion direction, namely in the case 52 or opposite to the locomotion direction, namely in the case 54.

FIGS. 8A and 8B are merely exemplarily. Other types of signals for reference beacons allow possibly also a determination in what direction a reference beacon is passed. For this, a reference beacon could, for example, also generate a signal that does not only vary temporally with respect to its field strength in the area 18, but also varies locally within the area 18, such that when the sensor 14 passes the area 18 it can be detected in what direction the area 18 is passed.

Thus, the above embodiments describe, among others, a mobile portable device that calculates its position in cooperation with signal emitting reference beacons 16 whose the position can be stored in an electronic map in the mobile portable device as well as in cooperation with at least one motion sensor existing in the mobile portable device that detects the movement of the mobile portable device, which allows exact determination of the absolute or relative position of the mobile portable device. All in all, a self-calibrating infrastructure system for local position detection will result. Here, FIG. 2 shows a mobile portable communication device provided with input and output means, such as in the form of a touch screen, a keyboard, a microphone as well as a display, an audio interface, a loudspeaker etc., as they are common in so-called smart phones, and further provided with at least one sensor (Mmov) for detecting the movement of the mobile portable communication device (M) such as in the form of position and/or acceleration sensors) and/or with at least one magnetic field sensor (Mmag) and/or with at least one light sensitive sensor (Mir) and/or with at least one lower-bitrate short-distance transmission interface (Msdr) and/or with at least one high-bit rate (Mbb) transmission interface and with at least one processing unit (Mcpu) for processing the information received from the sensors and/or also from the input means and transmission interfaces and to be transferred to the output means and transmission interfaces, wherein, by means of the data provided by the sensor (Mmov), the position of the mobile portable communication device (M) can be calculated relatively and/or absolutely to at least one reference beacon (Rx). Thus, FIG. 2 also shows a system for local positioning of a mobile portable communication device provided with input and output means, such as in the form of a touch screen, a keyboard, a microphone as well as a display, an audio interface, a loudspeaker etc., as they are common in so-called smart phones and further provided with at least one sensor (Mmov) for detecting the movement of the mobile portable communication device such as in the form of position and/or acceleration sensors and/or at least one magnetic field sensor (Mmag), and/or with at least one light sensitive sensor (Mir) and/or with at least one lower bit rate short distance transmission interface (Msdr), and/or with at least one high-bitrate (Mbb) transmission interface and with at least one processing unit (Mcpu) for processing the information received from the sensors but also from the input means and transmission interfaces and to be transferred to the output means and transmission interfaces, as well as one or several reference beacons (Rx, Ry, Rz) (generating a radio, light, infrared, and/or magnetic field signal for localizing purposes) which are disposed in a stationary manner at specific distances or at geographically sufficiently exactly known reference points, wherein the geographical positions of the reference beacons of the system are known to the system in the form of electronic maps where the position of the beacons is shown, wherein, advantageously via a communication network (e.g., radio, light, and/or infrared based) (K) the access of the mobile portable communication device (M) to further processing units or other mobile devices (M') is enabled.

In addition to the above description it should be noted that the at least one sensor 12 in addition or as an alternative to the above described examples 12a-c could also comprise one or several sensors for receiving an electromagnetic wave or an electromagnetic signal. For positioning between the beacons 16 by means of the one or several sensors 12, a Doppler shift resulting from a movement of the mobile portable device relative to the electromagnetic signal could be detected and motion direction, speed and/or acceleration of the device 10 could be determined therefrom. Such a Doppler shift effect evaluation could be applied to radio signals such as WLAN, Bluetooth or the same. This sensor/these sensors could therefore also be formed in a manner partly overlapping with the sensor 14a or could share hardware and/or software with the latter. They could be referred to as Doppler shift detector. When the locations of WLAN, Bluetooth, SDR transmitters are known, for example, it can be determined for positioning via a Doppler shift detector by means of Doppler shift evaluation whether the movement is towards such a transmitter or away from the same. If the difference between two measurement cycles is measured, i.e., the delta of the frequency between two cycles, acceleration can be calculated. If the device has access to a reference frequency, the device can even obtain absolute speed from the Doppler shift evaluation.

Although some aspects have been described in the context of an apparatus, it is clear that these aspects also represent a description of the corresponding method, such that a block or device of an apparatus corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may for example be stored on a machine readable carrier.

Other embodiments include the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transfer may be, for example, electronical or optical. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be universally usable hardware such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Mobile portable device, comprising
at least one first sensor for detecting a movement of the mobile portable device and
at least one second sensor for detecting the approximation of the mobile portable device to one or several reference beacons,
wherein the mobile portable device is implemented to calculate, by using a knowledge of a position of the one or several reference beacons, the position of the mobile portable device relative to the one or several reference beacons by means of data provided by the at least one first sensor,
wherein the at least one second sensor is implemented to receive a signal generated by the one or several reference beacons, and
the at least one second sensor comprises at least one magnetic field sensor and the signal generated by the one or several reference beacons is a magnetic field signal, or
the signal generated by the one or several reference beacons is a signal varying temporally and locally with respect to field strength in a surrounding area of the one or several reference beacons,
wherein the mobile portable device is implemented to correct, when passing a first reference beacon, the calculated position by comparison with a position of the first reference beacon and to calculate, between passing the first reference beacon and passing a second reference beacon, the position of the mobile portable device by means of the at least one first sensor relative to the corrected position with an inaccuracy increasing with increasing distance from the first reference beacon and to detect by means of the second sensor in what direction the mobile portable device passes a respective reference beacon, and to use the direction for correcting a currently calculated locomotion direction of the carrier of the device.

2. Mobile portable device according to claim 1, wherein the mobile portable device is implemented to use, when calculating the position between passing the first reference beacon and passing the second reference beacon, geographical circumstances in an electronic map for reducing the inaccuracy by limitations of degrees of freedom of movement of the mobile portable device corresponding to the geographical circumstances.

3. Mobile portable device according to claim 1 that is further implemented to also correct a motion direction of the mobile portable device when passing the first reference beacon.

4. Mobile portable device according to claim 1, wherein the at least one first sensor comprises a position and/or acceleration sensor.

5. Mobile portable device according to claim 1, wherein the at least one first sensor comprises one or several gyroscopes and/or one or several accelerometers and/or one or several magnetometers and/or one or several Doppler shift detectors.

6. Mobile portable device according to claim 1, wherein an electric map is stored in the mobile portable device where the position of the one or several reference beacons is shown, wherein the mobile portable device is implemented to use the electric map during calculation.

7. Mobile portable device according to claim 1, wherein the same is implemented to identify the one or several reference beacons based on information in the signal of the one or several reference beacons.

8. Mobile portable device according to claim 1, wherein the mobile portable device comprises a transmission interface for communication with communication interfaces of a communication network and is implemented to perform coarse localization based on the communication between transmission interface and communication interfaces and to use the coarse localization for identifying the one or several reference beacons.

9. System for local positioning of a mobile portable device with at least one first sensor for detecting the movement of the mobile portable device and at least one second sensor for detecting the approximation of the mobile portable device to one or several reference beacons, wherein the system comprises the one or several reference beacons, and wherein the system is implemented to calculate, by using a knowledge of a position of the one of several reference beacons, the position of the mobile portable device relative to the one or several reference beacons by means of data provided by the at least one first sensor,
wherein the at least one second sensor is implemented to receive a signal generated by the one or several reference beacons, and
the at least one second sensor comprises at least one magnetic field sensor and the signal generated by the one or several reference beacons is a magnetic field signal, or
the signal generated by the one or several reference beacons is a signal varying temporally and locally with respect to field strength in a surrounding area of the one or several reference beacons,
wherein the system is implemented to correct, when passing a first reference beacon, the calculated position by comparison with a position of the first reference beacon and to calculate, between passing the first reference beacon and passing a second reference beacon, the position of the mobile portable device by means of the at least one first sensor relative to the corrected position with an inaccuracy increasing with increasing distance from the first reference beacon and to detect by means of the second sensor in what direction the mobile portable device passes a respective reference beacon, and to use the direction for correcting a currently calculated locomotion direction of the carrier of the device.

10. Method for local positioning of a mobile portable device with at least one first sensor for detecting the movement of the mobile portable device and at least one second sensor for detecting the approximation of the mobile portable device to one or several reference beacons, wherein the method uses the one or several reference beacons and uses a knowledge of a position of the one or several reference beacons for calculating the position of the mobile portable device relative to the one or several reference beacons by means of data provided by the at least one first sensor, wherein the at least one second sensor is implemented to receive a signal generated by the one or several reference beacons, and the at least one second sensor comprises at least one magnetic field sensor and the signal generated by the one or several reference beacons is a magnetic field signal, or the signal generated by the one or several reference beacons is a signal varying temporally and locally with respect to field strength in a surrounding area of the one or several reference beacons, wherein, when passing a first reference beacon, the calculated position is corrected by comparison with a position of the first reference beacon and between passing the first reference beacon and passing a second reference beacon, the position of the mobile portable device is calculated by means of the at least one first sensor relative to the corrected position with an inaccuracy increasing with increasing distance from the first reference beacon and it is detected by means of the second sensor in what direction the mobile portable device passes a respective reference beacon, and the direction is used for correcting a currently calculated locomotion direction of the carrier of the device.

11. Mobile portable device, comprising
at least one first sensor for detecting a movement of the mobile portable device and
at least one second sensor for detecting the approximation of the mobile portable device to one or several reference beacons, wherein the mobile portable device is implemented to calculate, by using a knowledge of a position of the one or several reference beacons, the position of the mobile portable device relative to the one or several reference beacons by means of data provided by the at least one first sensor, wherein the at least one second sensor comprises one or several sensors for receiving an electromagnetic signal for detecting a Doppler shift resulting from a movement of the mobile portable device relative to the electromagnetic signal and for determining, based on the Doppler shift, motion direction, speed and/or acceleration of the mobile portable device.

12. Method for local positioning of a mobile portable device with at least one first sensor for detecting the movement of the mobile portable device and at least one second sensor for detecting the approximation of the mobile portable device to one or several reference beacons, wherein the method uses the one or several reference beacons and uses a knowledge of a position of the one or several reference beacons for calculating the position of the mobile portable device relative to the one or several reference beacons by means of data provided by the at least one first sensor, wherein the at least one second sensor comprises one or several sensors for receiving an electromagnetic signal for detecting a Doppler shift resulting from a movement of the mobile portable device relative to the electromagnetic signal and for determining, based on the Doppler shift, motion direction, speed and/or acceleration of the mobile portable device.

13. A non-transitory computer program comprising a program code for performing the method according to claim 10 when the program runs on a computer.

14. A non-transitory computer program comprising a program code for performing the method according to claim 12 when the program runs on a computer.

* * * * *